C. H. MACMILLAN.
REVERSING GEAR.
APPLICATION FILED JUNE 2, 1920.

1,350,324.

Patented Aug. 24, 1920.

Colin Hugh Macmillan,
Inventor.
Pennie, Davis, Marvin & Edmonds,
Attorneys.

UNITED STATES PATENT OFFICE.

COLIN HUGH MACMILLAN, OF ANNIESLAND, GLASGOW, SCOTLAND.

REVERSING-GEAR.

1,350,324.  Specification of Letters Patent.  Patented Aug. 24, 1920.

Application filed June 2, 1920. Serial No. 386,028.

*To all whom it may concern:*

Be it known that I, COLIN HUGH MACMILLAN, a subject of the King of the United Kingdom of Great Britain and Ireland, and residing at Anniesland, Glasgow, Scotland, have invented a certain new and useful Improvement in Reversing-Gears, of which the following is a specification.

This invention relates to reversing gear mechanism of the kind including a driver, a driven member and a differential gear interposed between the driver and the driven member, the arrangement being such that, when the driver is locked to the differential gear housing, the driven member is rotated forwardly and, when the differential gear housing is disengaged from the driver and held against rotation, the driven member is rotated rearwardly.

In reversing gears of this kind a friction clutch is usually provided for locking the gear housing to the driver and a brake interconnected with the clutch usually serves to hold the differential gear housing against rotation, the friction clutch being held forcibly in engagement with the driver by a spring or a lever and the brake being held in engagement with the housing by manual pressure on the lever.

It will be readily seen that, in the usual construction referred to, the effort applied to maintain the friction surfaces in engagement is constant and has no definite relation with the torque exercised on the driven member.

The present invention has for its primary object to provide an improved reversing gear mechanism in which the force applied to bring the clutch and the brake surfaces into frictional engagement with the driver and the arresting member is a function of the torque applied to the driven member.

Figure 1:
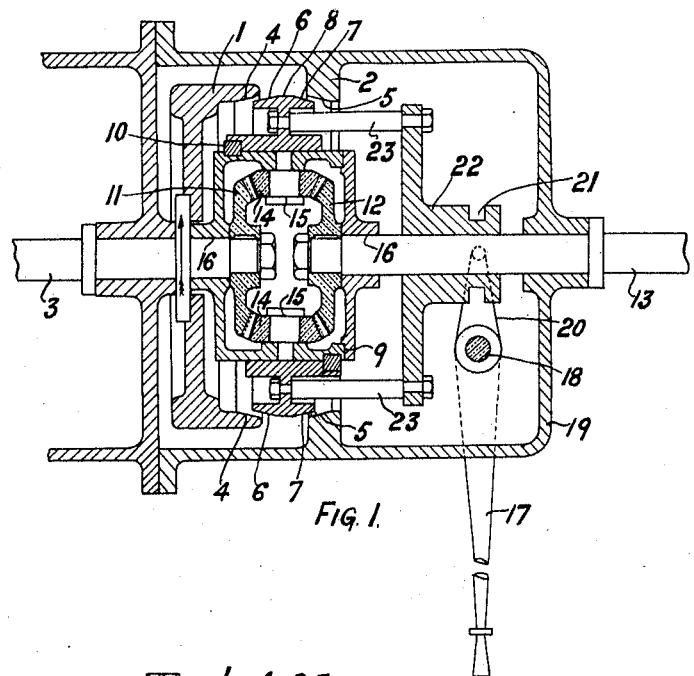
Figure 2:
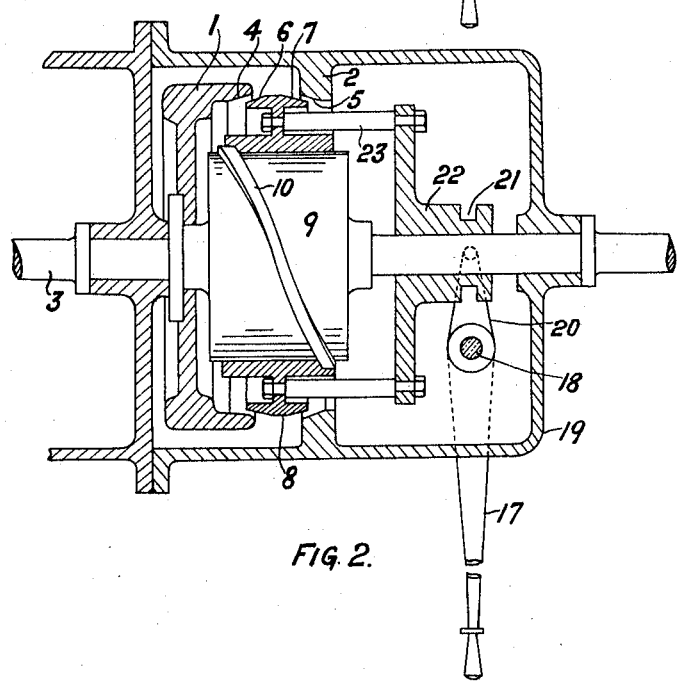

In the accompanying drawing which illustrates the invention diagrammatically Figure 1 is a sectional view and Fig. 2 is a part section, part elevation.

As shown, the improved reversing gear clutch mechanism includes a driver 1 and an arresting member 2 presenting, respectively, a female clutch face 4 and a brake face 5, the driver 1 being secured to a drive shaft 3 which may be constituted by an engine crank shaft.

The faces 4, 5 are adapted to coöperate with opposed faces 6, 7 on a clutch member 8 formed as a sleeve surrounding a differential gear housing 9. Interposed between the housing 9 and the clutch member 8 is a helical coupling member constituted by a helical key 10 secured to the housing 9 and engaging a correspondingly formed groove in the inner surface of the member 8, the helical key 10 serving to determine the path of the member 8 in relation to the housing 9.

The differential gear in its simplest form comprises a crown wheel 11 secured to the drive shaft 3, a crown wheel 12 secured to the driven shaft 13 which is preferably constituted by a propeller shaft, and idler bevel wheels 14 journaled on pins 15 secured in the housing 9. The housing 9 is loosely journaled on the drive shaft 3 and on a driven shaft at 16.

The clutch member 8 is shiftable by means of a lever 17 secured to a rock shaft 18 journaled in the stationary reversing gear casing 19, the rock shaft 18 being fitted with a fork 20 engaging a groove 21 in a collar 22 loosely fitted on the driven shaft 13 and connected by bolts 23 to the clutch member 8.

The clutch member 8 is shown in the neutral position from which it may be shifted by means of the lever 17, so that the face 6 engages the corresponding face 4 in the driver 1. Thus engaged, the member 8 performs a combined axial and circular movement in relation to the housing 9 until effective frictional engagement between the coöperating surfaces is reached whereupon the differential gear is locked to the driver 1 and the driven shaft 13 is constrained to rotate forwardly. The shifting movement of the member 8 into engagement with the arresting member 2 so that the face 7 engages the face 5 is accompanied by retardation of the clutch member 8 and by the performance by the clutch member of a combined circular and axial movement in relation to the housing 9 until the housing 9 is brought to rest and the gear acts as a reverse gear, the transmission being through the crown wheel 11, the idler wheels 14 and the crown wheel 12.

It will be seen that the construction shown and described answers entirely the objects of the invention as hereinbefore set forth; the resultant advantages will be apparent to those skilled in the art.

It is to be understood that the invention in its broader aspects is not limited to the particular construction described, since many changes may be made in the details of the parts without departure from the essence of the actual invention.

For convenience, the clutches and brakes herein referred to have been described as male and female brakes. It is to be understood, however, that any suitable friction parts may be selected to perform the function of the clutches and brakes described.

I claim:—

1. In a reversing gear, in combination, a drive shaft, a driven shaft, a differential gear interposed between said drive shaft and said driven shaft, a housing for said differential gear, a driver on said drive shaft provided with a clutch face, a stationary arresting member provided with a brake face, a clutch member sleeving said housing and provided with opposed faces engageable alternately with said clutch face and said brake face, means for shifting said clutch member toward said clutch face or toward said brake face, and means whereby the force effecting frictional engagement between said clutch member and said clutch face or between said clutch member and said brake face is proportionated to the torque exercised on said driven shaft.

2. In a reversing gear, in combination, a drive shaft, a driven shaft, a differential gear interposed between said drive shaft and said driven shaft, a housing for said differential gear, a driver on said drive shaft provided with a clutch face, a stationary arresting member provided with a brake face, a clutch member sleeving said housing and provided with opposed faces engageable alternately with said clutch face and said brake face, means for shifting said clutch member toward said clutch face or toward said brake face, and a helical coupling member interposed between said housing and said clutch member.

3. In a reversing gear, in combination, a drive shaft, a driven shaft coaxial therewith, a differential gear interposed between said drive shaft and said driven shaft, a housing for said differential gear, a driver on said drive shaft provided with a clutch face, a stationary arresting member provided with a brake face, a clutch member coaxial with said shafts, said clutch member sleeving said housing and provided with opposed faces engageable alternately with said clutch face and said brake face, means for shifting said clutch member axially toward said clutch face or toward said brake face, and a helical coupling member interposed between said housing and said clutch member.

4. In a reversing gear, in combination, a drive shaft, a driven shaft, a differential gear interposed between said drive shaft and said driven shaft, a housing for said differential gear, a helical key secured to said housing, a driver on said drive shaft provided with a female clutch face, a stationary arresting member provided with a female brake face, a clutch member sleeving said housing and provided with a helical groove accommodating said key, said clutch member provided with opposed male faces engageable alternately with said female clutch face and said female brake face, and means including a manually operable lever for shifting said clutch member toward said clutch face or toward said brake face.

5. In a reversing gear, in combination, a gear casing, a drive shaft, a driven shaft, a differential gear interposed between said drive shaft and said driven shaft, a housing for said differential gear, a driver on said drive shaft provided with a clutch face, an arresting member formed integral with said gear casing provided with a brake face, a clutch member sleeving said housing and provided with opposed faces engageable alternately with said clutch face and said brake face, clutch shifting means for moving said clutch member toward said clutch face or toward said brake face, and a helical coupling member interposed between said housing and said clutch member, said clutch shifting means comprising an axially movable grooved collar loosely fitted on said driven shaft and operatively connected to said clutch member, a rock-shaft journaled in said casing and provided with a fork engaging the grooved collar, and a manually operable lever connected to said rock-shaft.

In testimony whereof I have signed my name to this specification in the presence of two subscribing witnesses.

COLIN HUGH MACMILLAN.

Witnesses:
 ISABEL ROLLO,
 MAY ROSS.